(12) United States Patent
Kim

(10) Patent No.: US 9,258,466 B2
(45) Date of Patent: Feb. 9, 2016

(54) CAMERA MODULE

(71) Applicant: Samsung Electro-Mechanics Co., Ltd, Suwon-si (KR)

(72) Inventor: Duck Hun Kim, Hwaseong (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 13/709,767

(22) Filed: Dec. 10, 2012

(65) Prior Publication Data

US 2013/0162897 A1 Jun. 27, 2013

(30) Foreign Application Priority Data

Dec. 22, 2011 (KR) .................. 10-2011-0140410

(51) Int. Cl.
*H04N 5/225* (2006.01)
(52) U.S. Cl.
CPC ........... *H04N 5/2253* (2013.01); *H04N 5/2254* (2013.01); *H04N 5/2257* (2013.01)
(58) Field of Classification Search
CPC .................................................. H04N 5/2257
USPC .......................... 348/294, 335, 340, 373, 374
See application file for complete search history.

(56) References Cited

U.S. PATENT DOCUMENTS

| 2001/0050717 | A1* | 12/2001 | Yamada et al. | 348/340 |
| 2006/0034599 | A1* | 2/2006 | Osaka | 396/144 |
| 2006/0044455 | A1* | 3/2006 | Kim et al. | 348/360 |
| 2008/0037143 | A1* | 2/2008 | Yoon | 359/824 |
| 2008/0267603 | A1* | 10/2008 | Jung et al. | 396/111 |
| 2008/0278621 | A1* | 11/2008 | Cho et al. | 348/374 |
| 2009/0201414 | A1* | 8/2009 | Kinoshita | 348/374 |
| 2013/0050850 | A1* | 2/2013 | Lin | 359/738 |

FOREIGN PATENT DOCUMENTS

| JP | 2001333322 | 11/2001 |
| KR | 1020080093679 | 10/2008 |
| KR | 10-2009-0054206 | 5/2009 |
| KR | 10-2010-0061067 | 6/2010 |
| KR | 1020110048879 A | 5/2011 |

* cited by examiner

*Primary Examiner* — Twyler Haskins
*Assistant Examiner* — Dwight C Tejano
(74) *Attorney, Agent, or Firm* — NSIP Law

(57) ABSTRACT

Disclosed herein is a camera module including: a lens barrel including at least one lens L stacked and bonded therein and having a lower protrusion part formed on a bottom surface thereof; a housing having an internal space so as to receive the lens barrel therein and having a supporting surface supporting the lens barrel; and a substrate formed below the housing and having an image sensor mounted thereon.

5 Claims, 2 Drawing Sheets

CAMERA MODULE

CROSS REFERENCE(S) TO RELATED APPLICATIONS

This application claims the benefit under 35 U.S.C. Section 119 of Korean Patent Application Serial No. 10-2011-0140410, entitled "Camera Module" filed on Dec. 22, 2011, which is hereby incorporated by reference in its entirety into this application.

BACKGROUND OF THE INVENTION

1. Technical Field

The present invention relates to a camera module, and more particularly, to a camera module capable of being mounted at a portable terminal so as to photograph an image.

2. Description of the Related Art

In accordance with the recent development of a technology of a portable terminal such as a cellular phone, a personal digital assistant (PDA), a tablet personal computer (PC), and the like, the portable terminal has been used as multi-convergence such as a music, a movie, a television, a game, and the like, as well as a simple phone function. The most typical product among products leading the development to the multi-convergence may be a camera module. The camera module has been changed for implementation of various additional functions such as auto focusing AF and optical zoom simultaneously with changing based on high pixel.

The portable terminal as mentioned above tends to be miniaturized, slimed, and multi-functionalized according to preference of an element. In addition, as the camera module which is mounted at the portable terminal has also been gradually developed, a size of the camera module has decreased, and pixels and functions thereof have increased. Therefore, technologies for precisely manufacturing components which are mounted inside the camera module are also required for improving image performance and reference for evaluating thereof gradually become complicated.

In general, the camera module includes a substrate on which an image sensor is mounted, a housing which is closely bonded onto the substrate, and a lens barrel which is mounted on the housing, and matches an optical axis of a lens which is stacked and bonded in the lens barrel to an optical axis of the image sensor which is mounted on the substrate to allow an accurate image to be photographed.

However, when the camera module is assembled using many optical components including the image sensor, the optical axis between the image sensor and the lens may be distorted due to a tolerance by each part, an assembly tolerance or the like, that is, a tilt may be generated, such that resolution defects may occur in final products.

In this case, at the time of evaluating the image of the lens barrel which is mounted on the camera module among a plurality of optical components, a bottom surface of a press-fitting ring fixing the lens after stack-bonding the lens is used as an image evaluating reference surface of the lens barrel, wherein the bottom surface of the press-fitting ring has low flatness due to an accumulated error of a stack assembly which is generated at the time of bonding the lens, and a difference occurs in perpendicularity between measurements of the bottom surface of the lens barrel and a side of the module at the time of actually assembling the module, to cause a high defect ratio of the lens barrel at the time of evaluating lens performance and degrade the resolution.

SUMMARY OF THE INVENTION

An object of the present invention is to provide a camera module capable of preventing an occurrence of a tilt due to a flatness defect of a reference surface at the time of evaluating an image of a lens barrel.

According to an exemplary embodiment of the present invention, there is provided a camera module including: a lens barrel including at least one lens stacked and bonded therein and having a lower protrusion part formed on a bottom surface thereof; a housing having an internal space so as to receive the lens barrel therein and having a supporting surface supporting the lens barrel; and a substrate formed below the housing and having an image sensor mounted thereon.

The lower protrusion part may be provided in plural on the bottom surface of the lens barrel so as to be spaced apart from each other at a predetermined interval based on an optical axis.

The lens barrel may further include an upper protrusion part protruded from a seating surface on which an upper surface of the lens stacked and bonded to an uppermost layer is seated.

The upper protrusion part may be provided in plural on the seating surface of the lens so as to be spaced apart from each other at a predetermined interval based on an optical axis.

The lens barrel may further include a press-fitting ring injection-molded so as to support the lens stacked and bonded to the lowermost layer.

DESCRIPTION OF THE PREFERRED EMBODIMENTS

Hereinafter, exemplary embodiments of the present invention will be described with reference to the accompanying drawings. However, the exemplary embodiments are described by way of examples only and the present invention is not limited thereto.

In describing the present invention, when a detailed description of well-known technology relating to the present invention may unnecessarily make unclear the spirit of the present invention, a detailed description thereof will be omitted. Further, the following terminologies are defined in consideration of the functions in the present invention and may be construed in different ways by the intention of users and operators. Therefore, the definitions thereof should be construed based on the contents throughout the specification.

As a result, the spirit of the present invention is determined by the claims and the following exemplary embodiments may be provided to efficiently describe the spirit of the present invention to those skilled in the art.

Hereinafter, a camera module according to an exemplary embodiment of the present invention will be described in detail with reference to FIGS. 1 to 3.

Figure 1:
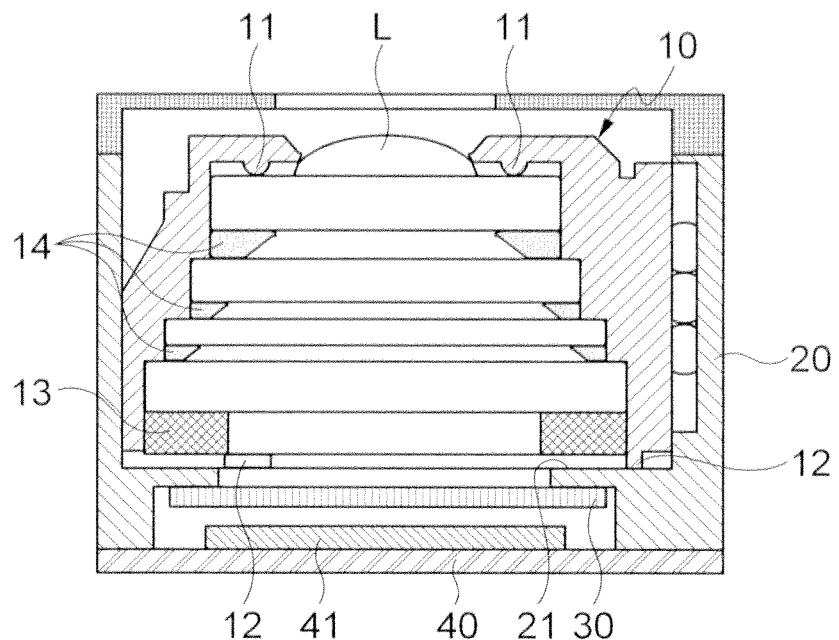
FIG. 1 is a cross-sectional view showing a camera module according to an exemplary embodiment of the present invention.
Figure 2:
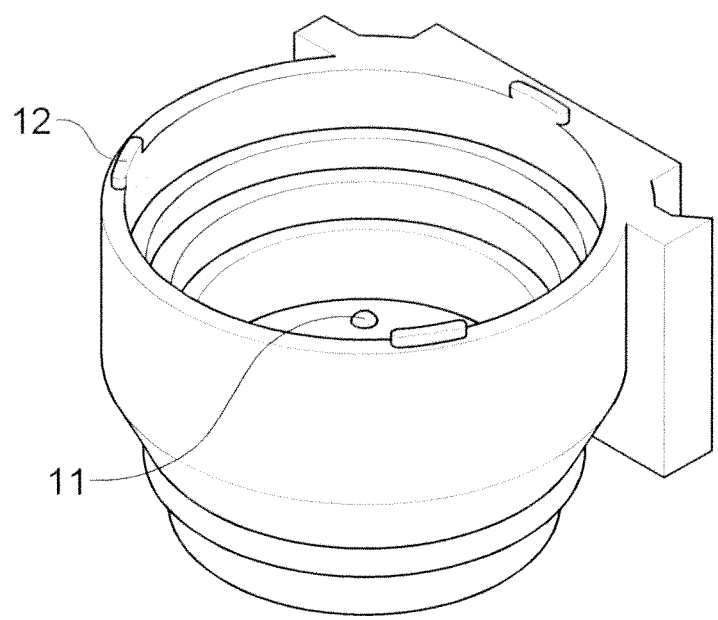
FIG. 2 is a bottom perspective view showing a lens barrel according to the exemplary embodiment of the present invention.
Figure 3:
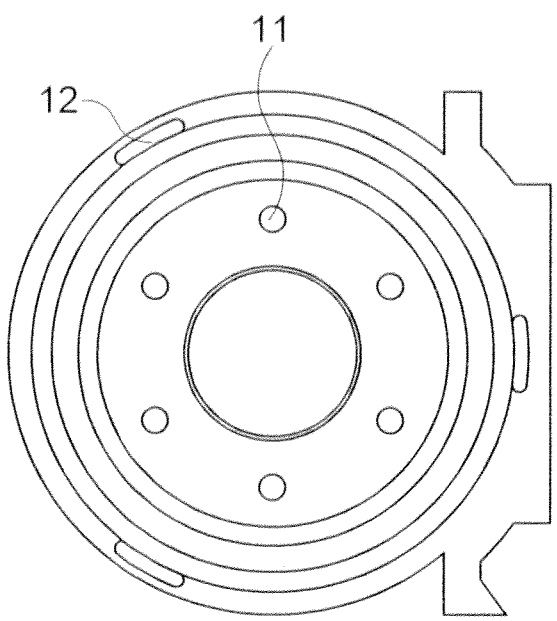
FIG. 3 is a bottom view showing a lens barrel according to the exemplary embodiment of the present invention.

FIG. 1 is a cross-sectional view showing a camera module according to an exemplary embodiment of the present invention, FIG. 2 is a bottom perspective view showing a lens barrel according to the exemplary embodiment of the present invention, and FIG. 3 is a bottom view showing a lens barrel according to the exemplary embodiment of the present invention.

As shown in FIGS. 1 to 3, the camera module according to the exemplary embodiment of the present invention may include a lens barrel 10 including at least one lens L stacked and bonded therein and having a lower protrusion part 12 formed on a bottom surface thereof, a housing 20 having an internal space so as to receive the lens barrel 10 therein and having a supporting surface 14 supporting the lens barrel 10, and a substrate 40 which is formed below the housing 20 and having an image sensor 41 mounted thereon.

The lens barrel 10 may be disposed so that the at least one lens L is bonded in a stack form and is inserted into the internal space of the housing 20 to move in an optical axis direction thereof. Therefore, a shape of the lens barrel 10 may be formed in a cylindrical shape so as to correspond to a shape of the housing 20, but is not limited thereto and may be variously designed according to an intention of a designer.

In this case, the lens L is formed of a plurality of lenses, and the number of the lens may be variously set according to the intension of the designer. In addition, a spacer 14 may be formed between respective lenses L. Here, the spacer 14 serves to adjust an interval between the lenses L and may be formed of a transparent material or an opaque material.

In addition, the lens barrel 10 includes the lenses L stacked and bonded therein, wherein an inner side of the bonding space may have a step shape so that each lens L of the plurality of lenses L may be seated therein.

Here, a seating surface of the lens barrel 10 on which an upper surface of the lens L stacked and bonded to an uppermost layer of the lenses stacked and bonded inside the lens barrel 10 may be provided with an upper protrusion part 11 protruded therefrom, such that the lens stacked and bonded to the uppermost layer may be seated thereon.

In this case, six upper protrusion parts 11 may be formed on the seating surface of the lens L so as to be spaced apart from each other at an interval of 60 degrees based on the optical axis of the lens, and may be protruded by about 0.001 mm to 1.0 mm at a size of ϕ0.001 mm to ϕ3.0 mm. In addition, the number of the upper protrusion parts 11 may be variously set according to the intention of the designer; however, it is preferable that the upper protrusion parts 11 are formed so as to maintain a constant flatness based on the optical axis of the lens L.

That is, the lens L is seated on the upper protrusion part 11, such that the flatness may be easily corrected based on the optical axis of the lens L, thereby making it possible to maintain a constant flatness.

In addition, the bottom surface of the lens barrel 10 may be provided with the lower protrusion part 12 protruded therefrom so as to be seated on the supporting surface 21 of the housing 20.

In this case, three lower protrusion parts 12 may be formed so as to be spaced apart from each other at an interval of 120 degrees based on the optical axis, and may be protruded at a height of 0.001 mm to 1.0 mm, a width of 0.001 mm to 0.3, and a length of 0.001 mm to 3.0 mm.

In addition, the number of the lower protrusion parts 12 may be variously set according to the intention of the designer; however, it is preferable that the lower protrusion parts 12 are formed so as to maintain a constant flatness based on the optical axis of the lens barrel 10.

That is, the lower protrusion part 12 of the lens barrel 10 may be seated on the supporting surface 21 of the housing 20, such that the flatness may be easily corrected based on the optical axis of the lens barrel 10, thereby making it possible to maintain a constant flatness.

In addition, a press-fitting ring 13 may be insertedly coupled so as to press-fix and support the lens L stacked and bonded to the lowermost layer of the lenses L stacked and bonded inside the lens barrel 10. In this case, the press-fitting ring 13 may be injection molded and formed of the same material as the lens barrel 10. That is, the press-fitting ring 13 insertedly bonded below the lens barrel 10 is formed of the same material as the lens barrel 10, such that the press-fitting ring 13 and the lens barrel 10 are equally contracted and expanded according to a temperature change, thereby making it possible to prevent the lens barrel 10 from being modified due to a modification of the press-fitting ring 13.

Meanwhile, below the lens barrel 10, an infrared filter 30 blocking an infrared ray having an excess long wavelength introduced through the lens L may be adhered to the bottom surface of the supporting surface 21 of the housing 20 using an adhesive.

In addition, a substrate 40 on which the image sensor 41 is mounted may be bonded to the lower part of the housing 20 to thereby convert an optical image received through the lens L to an electrical signal and control the converted electrical signal. In this case, the image sensor 41 may use a CCD image sensor, a CMOS image sensor, or the like.

The housing 20 may include an actuator (not shown) for moving the lens barrel 10 along an optical axis direction. Here, the actuator may move the lens barrel 10 by selecting one of an ultrasonic motor scheme using a piezo, a voice coil motor (VCM) scheme generating electromagnetic force using a magnet and a coil, or a scheme using a shape memory alloy. The exemplary embodiment of the present invention discloses the actuator of the VCM scheme. The actuator of the VCM scheme may be easily applied by those skilled in the art and therefore, the detail description thereof will be omitted.

Therefore, in the camera module according to the exemplary embodiment of the present invention, since the lens is seated on the upper protrusion part of the lens barrel and the lower protrusion part of the lens barrel is seated on the supporting surface of the housing, the flatness with respect to the bottom surface of the lens barrel may be constantly maintained regardless of the accumulated error occurring at the time of stack-assembling of the lens, the perpendicularity between the bottom surface and the side of the lens barrel may be constantly maintained at the time of being coupled with the housing, and the perpendicularity correlation may be improved, thereby preventing the tilt of the camera module and increasing the resolution.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

Accordingly, the scope of the present invention is not construed as being limited to the described embodiments but is defined by the appended claims as well as equivalents thereto.

What is claimed is:

1. A camera module comprising:
   a lens barrel including at least one lens stacked and bonded therein and having a lower protrusion part for maintaining a constant flatness formed on a bottom surface thereof; and
   a housing having an internal space so as to receive the lens barrel therein and having a supporting surface supporting the lens barrel, wherein there is a plurality of protrusion parts provided on the bottom surface of the lens barrel, wherein each of the lower protrusion parts is not an electrical connecting means, and wherein the plurality of lower protrusion parts is protruded at a height of 0.001 mm to 1.0 mm, a width of 0.001 mm to 0.3 mm, and a length of 0.001 mm to 3.0 mm.

2. The camera module according to claim 1, wherein the lower protrusion part is provided in plural on the bottom surface of the lens barrel so as to be spaced apart from each other at a predetermined interval based on an optical axis.

3. The camera module according to claim 1, wherein the lens barrel further includes an upper protrusion part protruded from a seating surface on which an upper surface of the lens stacked and bonded to an uppermost layer is seated.

4. The camera module according to claim 3, wherein the upper protrusion part is provided in plural on the seating surface of the lens so as to be spaced apart from each other at a predetermined interval based on an optical axis.

5. The camera module according to claim 1, wherein the lens barrel further includes a press-fitting ring injection-molded so as to support the lens stacked and bonded to the lowermost layer.

* * * * *